Jan. 24, 1967  G. O. WALTER ETAL  3,299,772
DOCUMENT FEEDER FOR PHOTOGRAPHIC COPIER
Filed April 19, 1963  2 Sheets-Sheet 1
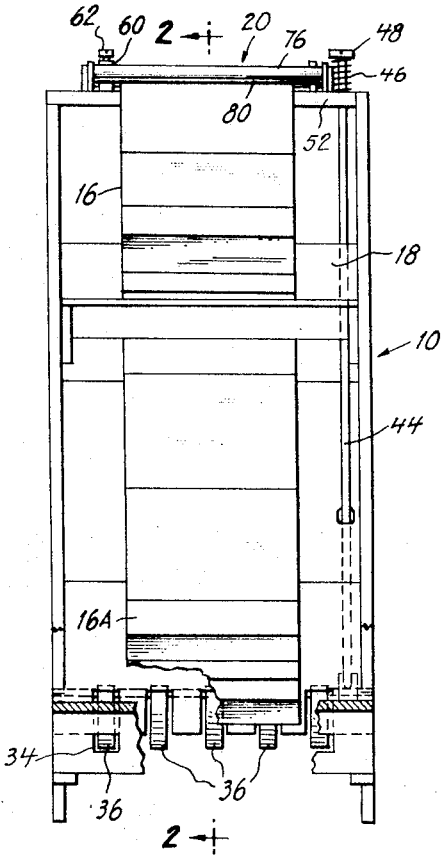
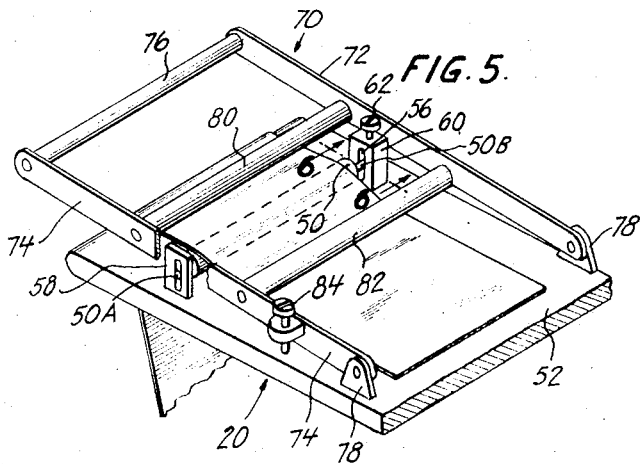
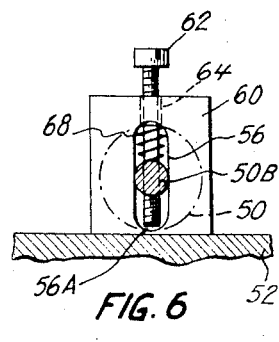
INVENTORS.
GERARD O. WALTER
EMIL A. SCORDATO
BY
A. J. De Angelis
ATTORNEY

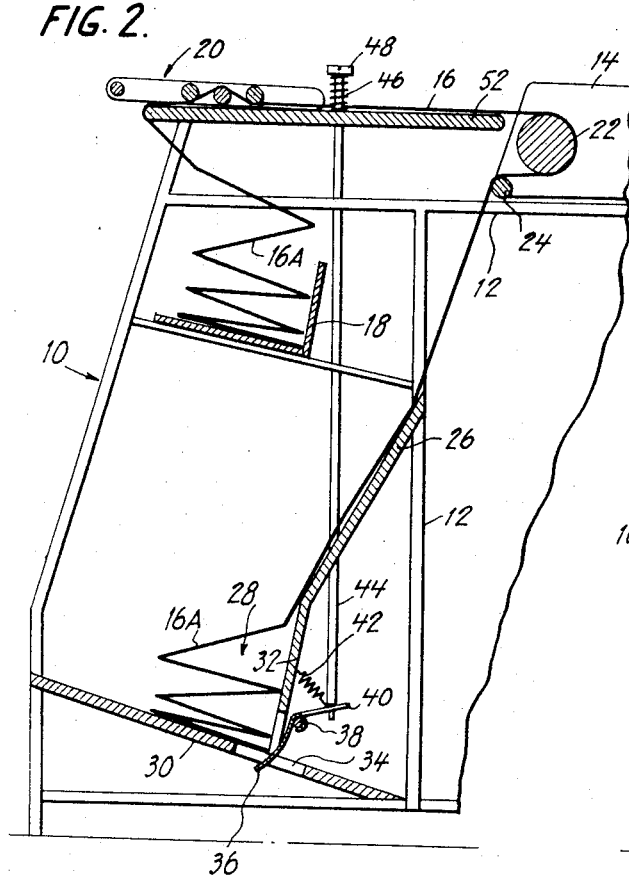
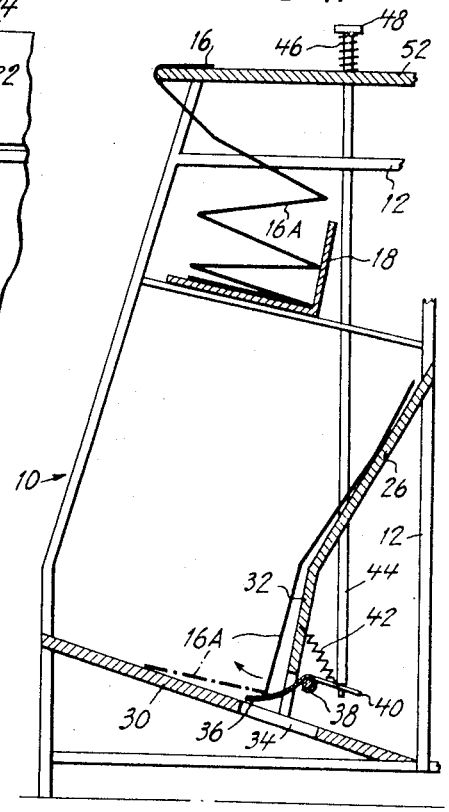
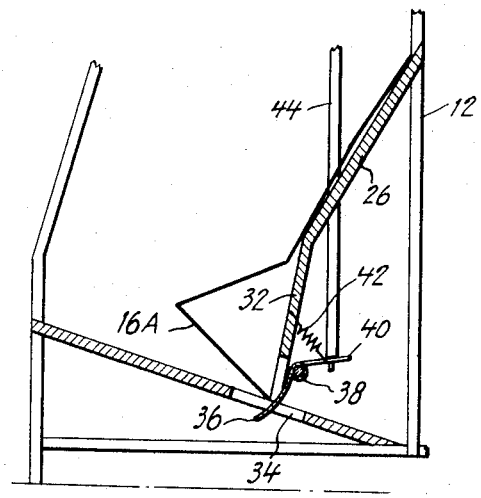
INVENTORS.
GERARD O. WALTER
EMIL A. SCORDATO
BY
*A. J. De Angelis*
ATTORNEY

000000

United States Patent Office 3,299,772
Patented Jan. 24, 1967

3,299,772
DOCUMENT FEEDER FOR PHOTOGRAPHIC
COPIER
Gerard O. Walter, Westbury, and Emil A. Scordato, Bronxville, N.Y., assignors to Sperry Rand Corporation, New York, N.Y., a corporation of Delaware
Filed Apr. 19, 1963, Ser. No. 274,269
6 Claims. (Cl. 88—24)

The invention relates to document feeders and, more particularly, to an arrangement for feeding double sided documents of the continuous strip fanfold type to a camera for copying.

It is sometimes desirable to copy photographically documents which are in the form of continuous strips multi-folded into a stack in fanfold form. Such fanfold documents usually contain intelligible matter on both sides or faces of the folded strip, necessitating that both sides of the folded strip be exposed for copying. In cameras of the single sided exposure type, the folded document strip must be unfolded, as it is fed into the camera for photographing of one document side, and properly refolded, as it exits from the camera. The refolded strip must then be orientated for photographing of its opposite side, and again unfolded, as it is fed through the camera. Upon exiting from the camera, the document strip must be properly refolded notwithstanding that the orientation of the strip and, in turn, the folds is now reversed.

It is desirable to provide in such a fanfold document feeder means for insuring that the document, as it is unfolded and fed into the camera, is smooth and unwrinkled, and, upon exiting therefrom, is refolded properly.

It is, therefore, an object of the invention to provide improved mechanism for feeding folded continuous strip documents to a photographic copier.

It is a further object to provide mechanism for feeding such continuous strip fanfold material unwrinkled to a copier.

It is still another object to provide mechanism for automatically refolding fanfold documents regardless of the orientation of the document strip.

The invention involves providing improved document tensioning mechanism in feeding fanfold material to a camera from a feed bin, and the provision of guide bar means of predetermined geometric configuration to restack or refold properly the fanfold strip, as it exits from the camera into a restack bin. In addition, manually actuatable guide fingers are provided, which fingers are operable to intercept the leading edge of the fanfold document strip and guide it into a predetermined refold position.

Features and advantages of the invention will be seen from the above, from the following description of operation when considered in conjunction with the drawings and from the appended claims.

In the drawings:

FIG. 1 is a simplified schematic view, in front elevation, of a document feeder, embodying the invention;

FIG. 2 is a cross sectional view taken along line 2—2 of FIG. 1, showing a fanfolded strip document 16 being fed through a camera from a feed bin to a refold bin; the strip being shown for a given orientation of its folds;

FIG. 3 is a fragmentary schematic side view of a portion of the mechanism of FIG. 2, showing the leading edge of a fanfold document strip as it is guided into folded position in a refold bin;

FIG. 4 is a fragmentary schematic view similar to that of FIG. 2 illustrating the fanfold document strip 16 with its folds oppositely orientated from that of FIG. 2 and with guide mechanism actuated for guiding the strip into proper refold position;

FIG. 5 is an enlarged fragmentary schematic view in perspective of the document tensioning mechanism 20 of FIG. 2; and FIG. 6 is an enlarged fragmentary schematic view taken along line 6—6 of FIG. 5 and showing details of a portion of the tensioning mechanism.

With reference to the drawings, 10 generally designates an open frame type stand, consisting of a plurality of frame members 12 of bar stock secured to each other in any convenient manner, as by welding. A photographic copier 14 (see FIG. 2) of the "single sided exposure" type microfilm camera is mounted on frame 10 in position for photographing a fanfold strip document 16. Document 16 is fed from a feed bin, generally designated 18, through a document tensioning assembly 20 and thence to document transport 22 of copier 14 for photographing of a first document side. As document 16 leaves transport 22, it rides over idler sheave 24 and exits from copier 14, falling into a guide chute 26.

Guide chute 26 is in the form of a sheet metal plate secured to frame member 12 of stand 10 at a predetermined acute angle with the vertical for guiding document 16, as it exits from copier 14, downward into a refold bin 28. Refold bin 28 is of substantially L-shaped cross sectional configuration and consists of a bottom plate 30 and a vertical plate 32. Bin 28 is secured to frame members 12 of stand 10 with bin bottom plate 30 lying at an acute angle with the horizontal and bin vertical plate 32 connected at its uppermost end with the lower edge of guide chute 26. In one tested embodiment, satisfactory refolding operation of document 16 was obtained with guide chute 26 terminating approximately two times the length of a document fold 16A above bottom plate 30 of refold bin 28.

Slots 34 are defined at spaced intervals along the junction of vertical plate 32 and bottom plate 30 of restack bin 28, and are provided for receiving guide fingers 36, one for each slot 34. Fingers 36 are each secured to a common shaft 38 which is pivotably mounted on vertical plate 32. A shaft actuating member 40 is secured to shaft 38 and protrudes therefrom. A spring 42, having one end attached to vertical plate 32 and the other end attached to actuating member 40, is maintained under tension, to bias shaft 38 and, in turn, guide fingers 36 into the unactuated position shown in FIG. 2. An actuating rod 44 is vertically mounted for limited vertical movement in stand 10 with the lowermost end of the rod loosely secured to actuating member 40. A return spring 46 biases rod 44 to an unactuated raised position (FIG. 2). Manual downward force exerted on head 48 of rod 44 urges the rod downward against the bias of spring 46. Such downward movement if rod 44 rotates shaft 38 clockwise against the bias of spring 42, actuating guide fingers 36 through slots 34 into restack bin 28 to the position shown in FIG. 4, for purposes to be explained hereinafter.

Document tensioning mechanism 20 includes a tension bar 50 (FIGS. 2 and 5) mounted for limited vertical movement in end support members 58, 60 protruding upward from a feed table 52 (FIG. 5). Tension bar 50 is necked down at its ends 50A and 50B, which ends are disposed in vertical elongated slots 54, 56 formed in end support members 58, 60, respectively. The necked down portion 50B of roller 50 disposed in a slot 56 is tapped to receive an adjusting or leveling screw 62 (FIG. 6). Screw 62 passes through oversize aperture 64 defined in end support member 60 into elongated slot 56 is threaded through necked down portion 50B of roller 50 to bottom on the lower inner surface 56A of elongated slot 56. A spring 68 under compression is fitted around screw 62 in elongated slot 56. Spring 68 engages the uppermost portion of roller end 50B to maintain screw 62 bottomed.

Tensioning mechanism 20 also includes a tension rack assembly 70 consisting of two spaced apart side bars 72, 74 secured to each other at one end by a hand bar 76 and pivoted at their respective other ends to brackets 78 protruding from feed table 52. Two tension rollers 80, 82 are journalled to side bars 72, 74 in position to fall on either side of tension bar 50 when tension rack assembly 70 is lowered into position. Tension rollers 80, 82 press document 16 downward onto feed table 52 on either side of tension bar 50. An adjustment screw 84 threaded through a projection formed integral with side bar 74 of rack assembly 70 bottoms on feed table 52 for adjusting the force with which tension rollers 80, 82 press upon document 16.

In operation, a fanfold document stack is placed in feed bin 18 (FIG. 2). The leading edge of the document is fed up over the front edge of feed table 52. With tension rack assembly 70 in raised position document 16 is placed over tension bar 50 and thence into copier 14. The document is then threaded through camera transport 22 and over idler 24 to guide chute 26. Tension rack assembly 70 is then lowered, placing tension rollers 80 and 82 over the top surface of the document 16 on either side of tension bar 50. Leveling screw 62 is threaded into bar end 50B to place tension bar 50 at a proper incline with the horizontal to bias document 16 towards one side of feed table 52. The amount of force exerted upon document 16 by tension rollers 80, 82 is then adjusted by means of adjusting screw 84, which effectively raises or lowers tension rack assembly 70. The adjustment is such as to provide for wrinkle free feeding of the document 16 to copier 14. Such tension is effected by the reverse bends imparted to document 16 by rollers 80, 82 and tension bar 50 and the frictional drag imparted to the document 16 by the forces necessary to rotate tension rollers 80, 82. The proper setting of adjusting screw 84 is determined by visually scanning the document surface for a smooth and unwrinkled appearance.

The leading edge of document 16 is guided by guide chute 26 into restack bin 28. As the leading edge of document 16 arrives at the junction of guide plate 26 and vertical plate 32 of the restack bin, the leading edge falls free of guiding chute 26 downward into engagement with the bottom base plate 30 of the restack bin. Due to the relative positioning of bin 28 and chute 26, previously described, the leading edge of the document 16 is caused to fold inward (FIG. 3) hitting vertical plate 32 and initiating proper refolding of document 16.

Next assume that document strip 16 is fed through the copier 14 to photograph the opposite document surface. The document stack is placed in feed bin 18 (FIG. 4) with its leading and trailing edges orientated oppositely then for photographing the other surface, as previously described in FIG. 2. In such a case for proper restacking of document strip 16 in restack bin 28 as it exits from copier 14, the leading edge of document 16, as it enters restack bin 28, must be guided outwardly. To accomplish this, the operator manually actuates vertical rod 44 downward, rotating shaft 38 clockwise against the bias of spring 42. Such clockwise rotation moves guide fingers 36 (carried by shaft 38) through guide slots 34 (formed at the apex of refold bin 28) into the bin cavity and into position to engage the leading edge of document 16 as it approaches bottom base plate 30 of the restack bin 28. As may be seen in FIG. 4, in such position, guide fingers 36 engage and impart an outward movement to the leading edge of document 16 (shown in broken line outline), thereby initiating proper refolding of document 16 in proper fold orientation. The operator may then release vertical rod 44 which is returned to its unactuated raised position by its return spring 46.

As changes can be made in the above described construction and many apparently different embodiments of this invention can be made without departing from the scope thereof, it is intended that all matter contained in the above description or shown on the accompanying drawings be interpreted as illustrative only and not in a limiting sense.

What is claimed is:

1. Mechanism for feeding continuous strip documents in fanfold form through a photographic copier which includes transport means for imparting driven movement to said strip document, said mechanism comprising, a mounting stand, a photographic copier mounted on said stand, a feed bin mounted on said stand for holding the stacked fanfold document strip to be copied, a feed table horizontally mounted on said stand in position for supporting said document strip as it approaches said copier in being driven from said feed bin to said copier by said transport means, document tensioning means mounted on said stand for tensioning said document strip as it is fed to said copier to present an unwrinkled strip thereto, a restack bin disposed below said copier, a guide chute mounted on said stand in position for guiding said document strip as it exists from said copier to said restack bin, said chute and restack bin being positioned with respect to each other and configured to cause, under conditions where said document folds are orientated in a first manner, automatic resacking of said document in said restack bin, and document guiding means selectively operative for engaging the leading edge of the fanfold document strip as said leading edge arrives at said restack bin and directing said leading edge in a predetermined direction to cause automatic restacking of said document according to a second fold orientation, said document guiding means including at least one guide finger manually actuatable into said restack bin into the path of the leading edge of the fanfold document strip as said leading edge falls into said restack bin.

2. Mechanism for feeding continuous strip documents in fanfold form through a photographic copier which includes transport means for imparting driven movement to said strip document, said mechanism comprising, a mounting stand, a photographic copier mounted on said stand, a feed bin mounted on said stand for holding the stacked fanfold document strip to be copied, document tensioning means mounted on said stand along the path of travel of said strip document for tensioning said strip document to unwrinkled condition as it is fed to said copier, a restack bin mounted on said stand below said copier, a guide chute mounted on said stand at an incline for guiding said document downward to said restack bin from said copier, said chute and bin being positioned with respect to each other and configured to cause automatic restacking of said document in said restack bin when said document folds are orientated in a first manner, and document guiding means selectively operative for engaging the leading edge of the fanfold strip document as said leading edge arrives at said restack bin and directing said leading edge in a predetermined direction to cause automatic restacking of said strip document according to a second fold orientation, said document guiding means including at least one guide finger manually actuatable into said restack bin into the path of the leading edge of the fanfold document strip as said leading edge falls into said restack bin.

3. Mechanism for feeding continuous strip documents in fanfold form through a photographic copier which includes transport means for imparting driven movement to said strip document, said mechanism comprising, a mounting stand, a photographic copier mounted on said stand, a feed bin mounted on said stand for holding the stacked fanfold document strip to be copied, a feed table horizontally mounted on said stand in position for supporting said document strip as it approaches said copier in being driven from said feed bin to said copier by said transport means, document tensioning means mounted on said stand for tensioning said document strip as it is fed to said copier to present an unwrinkled strip thereto, said tensioning means including a rod disposed across the path of travel of said document to said copier causing said document strip to ride over said rod, two tension rollers mounted for manual positioning on either side of said rod on top of said document strip to cause said strip to go through a reverse bend, and means for adjusting the pressure of said tension rollers on said document strip, a restack bin disposed below said copier, a guide chute mounted on said stand in position for guiding said document strip as it exits from said copier to said restack bin, said chute and restack bin being positioned with respect to each other and configurated to cause, under conditions where said document folds are orientated in a first manner, automatic restacking of said document in said restack bin, and document guiding means selectively operative for engaging the leading edge of the fanfold document strip as said leading edge arrives at said restack bin and directing said leading edge in a predetermined direction to cause automatic restacking of said document according to a second fold orientation.

4. Mechanism for feeding continuous strip documents in fanfold form through a photographic copier which includes transport means for imparting driven movement to said strip document, said mechanism comprising, a mounting stand, a photographic copier mounted on said stand, a feed bin mounted on said stand for holding the stacked fanfold document strip to be copied, a feed table horizontally mounted on said stand in position for supporting said document strip as it approaches said copier in being driven from said feed bin to said copier by said transport means, a rod disposed on said feed table across the path of travel of said document strip, means for setting said rod into a plurality of predetermiend tilted positions above said feed table for biasing said document strip laterally as such strip is driven over said rod, document tensioning means mounted on said stand for tensioning said document strip as it is fed to said copier to present an unwrinkled strip thereto, a restack bin disposed below said copier, a guide chute mounted on said stand in position for guiding said document strip as it exits from said copier to said restack bin, said chute and restack bin being positioned with respect to each other and configurated to cause, under conditions where said document folds are orientated in a first manner, automatic restacking of said document in said restack bin, and document guiding means selectively operative for engaging the leading edge of the fanfold document strip as said leading edge arrives at said restack bin and directing said leading edge in a predetermined direction to cause automatic restacking of said document according to a second fold orientation.

5. Mechanism for feeding continuous strip documents in fanfold form through a photographic copier which includes transport means for imparting driven movement to said strip document, said document folds being of a certain length, said mechanism comprising, a mounting stand, a photographic copier mounted on said stand, a feed bin mounted on said stand for holding the stacked fanfold document strip to be copied, a feed table horizontally mounted on said stand in position for supporting said document strip as it approaches said copier in being driven from said feed bin to said copier by said transport means, document tensioning means mounted on said stand for tensioning said document strip as it is fed to said copier to present an unwrinkled strip thereto, a restack bin disposed below said copier, a guide chute mounted on said stand in position for guiding said document strip as it exits from said copier to said restack bin, said restack bin being of L-cross sectional shape and having a vertical plate joined to a base plate, said vertical plate extending upwardly to said guide chute a distance at least greater than said certain document length, said restack bin mounted with its base plate at a slight acute angle above the horizontal plane, said chute and restack bin being positioned with respect to each other and configurated to cause, under conditions where said document folds are orientated in a first manner, automatic restacking of said document in said restack bin, and document guiding means selectively operative for engaging the leading edge of the fanfold document strip as said leading edge arrives at said restack bin and directing said leading edge in a predetermined direction to cause automatic restacking of said document according to a second fold orientation.

6. Mechanism for feeding continuous strip documents in fanfold from through a photographic copier which includes transport means for imparting driven movement to said strip document, said mechanism comprising, a mounting stand, a photographic copier mounted on said stand, a feed bin mounted on said stand for holding the stacked fanfold document strip to be copied, document tensioning means mounted on said stand along the path of travel of said strip document for tensioning said strip document to unwrinkled condition as it is fed to said copier, a restack bin mounted on said stand at an incline for guiding said document downward to said restack bin from said copier, said restack bin being of L-cross sectional shape and having a vertical plate joined to a base plate, said chute and bin being positioned with respect to each other and configurated to cause automatic restacking of said document in said restack bin when said document folds are orientated in a first manner, said restacking having spaced slots defined at the junction of said bin plates, and document guiding means selectively operative for engaging the leading edge of the fanfold strip document as said leading edge arrives at said restack bin and directing said leading edge in a predetermined direction to cause automatic restacking of said strip document according to a second fold orientation, said document guiding means including a plurality of guide fingers, one for each of said slots and aligned therewith, said fingers being actuatable in unison through their respective corresponding slots into said restack bin into position for engaging said leading edge of said strip document.

References Cited by the Examiner

UNITED STATES PATENTS

| | | | |
|---|---|---|---|
| 2,740,326 | 4/1956 | Reinebach | 88—28 |
| 2,849,916 | 9/1958 | Nolan | 88—24 |
| 3,255,662 | 6/1966 | Call | 88—24 |

FOREIGN PATENTS 1,234,223   5/1960   France.

NORTON ANSHER, *Primary Examiner.*

R. A. WINTERCORN, *Assistant Examiner.*